United States Patent
Kawamura et al.

(10) Patent No.: US 8,398,248 B2
(45) Date of Patent: Mar. 19, 2013

(54) PROJECTOR THAT OPERATES IN A BRIGHTNESS PRIORITY MODE AND IN A CONTRAST PRIORITY MODE

(75) Inventors: Masakazu Kawamura, Matsumoto (JP); Daisuke Hayashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 480 days.

(21) Appl. No.: 12/699,449

(22) Filed: Feb. 3, 2010

(65) Prior Publication Data

US 2010/0208214 A1    Aug. 19, 2010

(30) Foreign Application Priority Data

Feb. 18, 2009   (JP) .................. 2009-034906

(51) Int. Cl.
*G03B 21/14*   (2006.01)

(52) U.S. Cl. .......................................... 353/88

(58) Field of Classification Search .............. 353/7, 88, 353/97; 362/268, 277, 279, 281
See application file for complete search history.

(56) References Cited

U.S. PATENT DOCUMENTS

| 6,442,343 B2 | 8/2002 | Kameyama et al. |
| 7,185,990 B2 | 3/2007 | Koga et al. |
| 7,344,255 B2 | 3/2008 | Hara et al. |
| 2005/0068505 A1* | 3/2005 | Momose et al. ............... 353/97 |
| 2005/0219474 A1* | 10/2005 | Hara et al. ..................... 353/88 |

FOREIGN PATENT DOCUMENTS

| JP | A 2002-49075 | 2/2002 |
| JP | A 2004-69966 | 3/2004 |
| JP | A 2005-292764 | 10/2005 |
| JP | A 2007-71913 | 3/2007 |
| JP | A 2007-93741 | 4/2007 |
| WO | WO 2005/026835 A1 | 3/2005 |

* cited by examiner

Primary Examiner — Thanh Luu
Assistant Examiner — Danell L Owens
(74) Attorney, Agent, or Firm — Oliff & Berridge, PLC

(57) ABSTRACT

A projector includes: an illuminating device including a light source device, a first lens array that comprises first regions located at four corners in the first lens array when viewed along a system optical axis and second regions located between the two first regions, and a second lens array; a light modulating device; a projection optical system; a light control device; and a mode selection device. The light control device blocks part of the plural partial light beams by causing first and second light shields to integrally operate, when the brightness priority mode is selected. The light control device always blocks part of the partial light beams with the first light shields and blocks part of the partial light beams by causing the second light shields to operate independently from the first light shields.

6 Claims, 11 Drawing Sheets

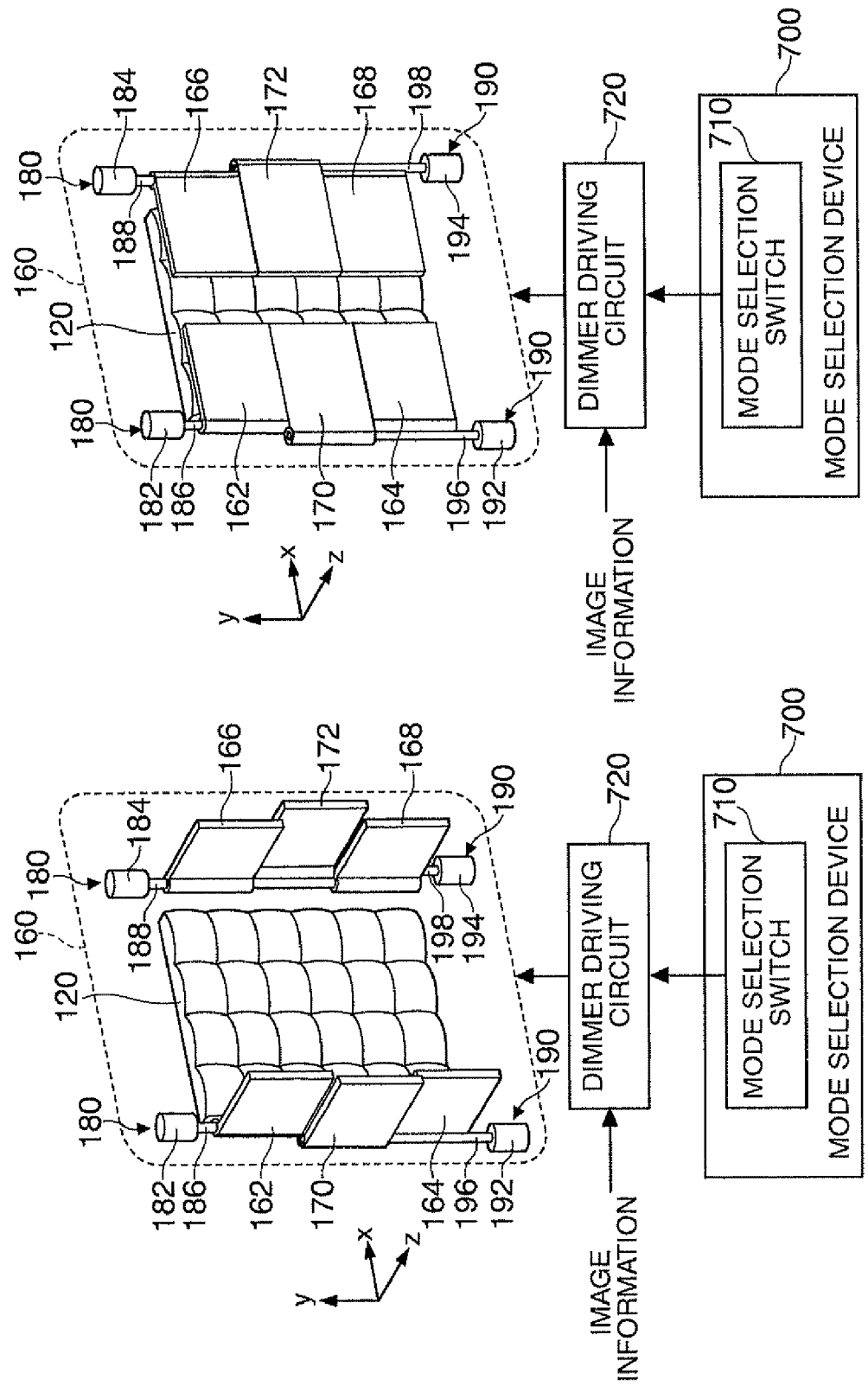

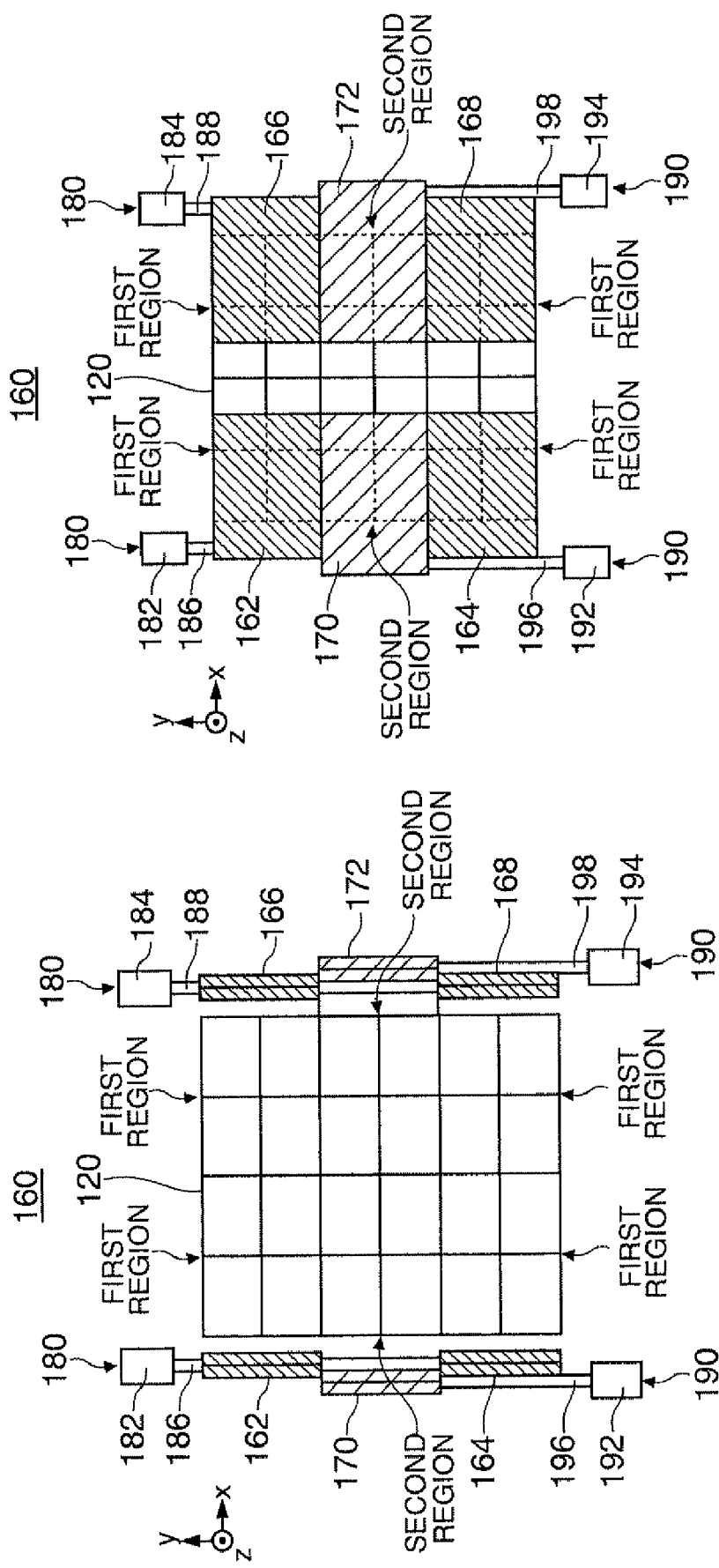

| MODE | BRIGHTNESS | CONTRAST |
|---|---|---|
| BRIGHTNESS PRIORITY MODE | ◎ | ○ |
| CONTRAST PRIORITY MODE | ○ | ◎ |

FIG. 6

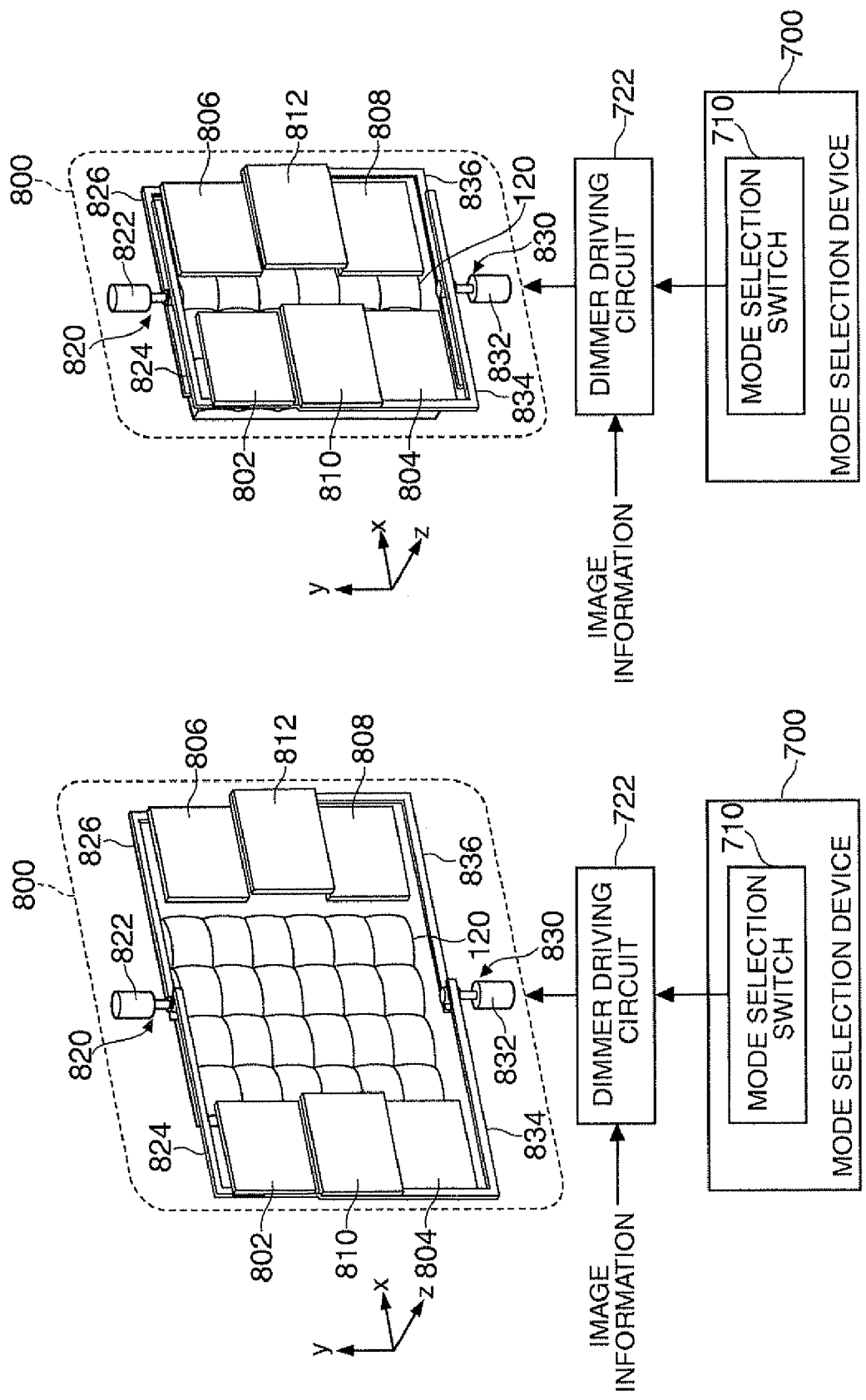

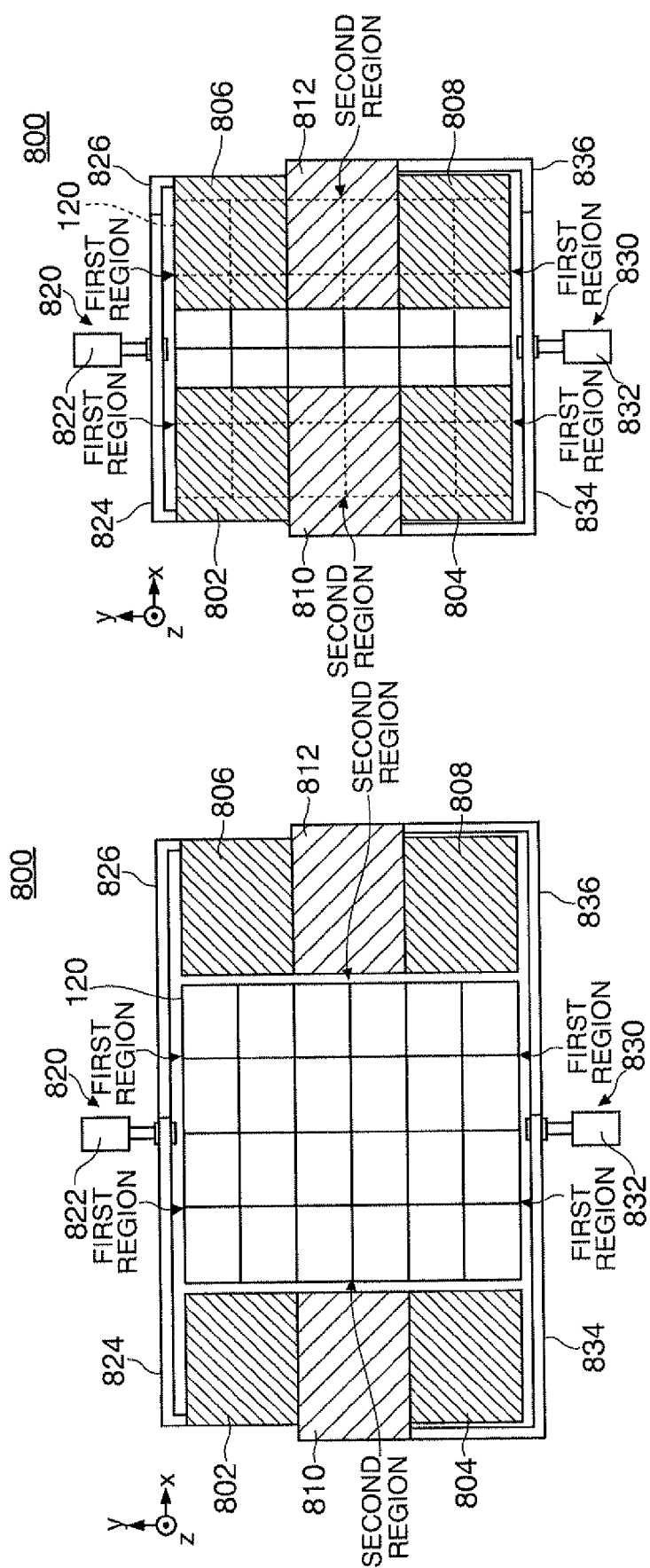

PROJECTOR THAT OPERATES IN A BRIGHTNESS PRIORITY MODE AND IN A CONTRAST PRIORITY MODE

BACKGROUND

1. Technical Field

The present invention relates to a projector.

2. Related Art

In the past, there is known a projector including: an illuminating device including a light source device that emits light, a first lens array having plural first small lenses for dividing the light emitted from the light source device into plural partial light beams, a second lens array having plural second small lenses corresponding to the plural first small lenses, and a superimposing lens for superimposing the partial light beams from the plural second small lenses in an illuminated region; a light modulating device that modulates illumination light from the illuminating device according to image information; and a projection optical system that projects modulated light from the light modulating device as a projection image, the projector further including a diaphragm for switching a brightness priority mode and a contrast priority mode (see, for example, JP-A-2007-93741).

With the projector in the past, when the brightness priority mode is selected, it is possible to allow all the partial light beams passing through the second lens array to pass to realize a bright projection image. When the contrast priority mode is selected, it is possible to allow only the partial light beams passing through the center of the second lens array to pass to realize high-contrast projection image. This is because, since the partial light beams passing through the center of the second lens array are made incident on the light modulating device at a deep angle, the high-contrast projection image is realized.

There is known a projector including a light control device that increases or reduces a light amount of light irradiated on a light modulating device by blocking plural partial light beams with a light blocking amount corresponding to image information (see, for example, JP-A-2004-69966). With such a projector, since an amount of light irradiated on the light modulating device is increased or reduced, it is possible to project a projection image having a wide dynamic range (a ratio of projectable maximum brightness and minimum brightness).

However, when it is attempted to apply the light control device to the projector in the past, in the contrast priority mode, since only the partial light beams passing through the center of the second lens array are allowed to pass to realize a high-contrast projection image, plural partial light beams cannot be blocked with the light blocking amount corresponding to the image information and the projection image having the wide dynamic range cannot be projected.

SUMMARY

An advantage of some aspects of the invention is to provide a projector that can select the brightness priority mode and the contrast priority mode and project, in both the modes, a projection image having a wide dynamic range.

According to an aspect of the invention, there is provided a projector including: an illuminating device including at least a light source device that emits light, a first lens array having plural first small lenses for dividing the light emitted from the light source device into plural partial light beams, and a second lens array having plural second small lenses corresponding to the plural first small lenses; a light modulating device that modulates illumination light from the illuminating device according to image information; a projection optical system that projects modulated light from the light modulating device as a projection image; and a light control device that is disposed in an optical path between the first lens array and the second lens array and increases or reduces a light amount of light irradiated on the light modulating device by blocking the plural partial light beams with a light blocking amount corresponding to the image information. The projector further includes a mode selection device that selects in which of a brightness priority mode and a contrast priority mode the light control device should be caused to operate. The light control device includes first light shields for blocking partial light beams emitted from first regions located at four corners in the first lens array when viewed along a system optical axis and second light shields for blocking partial light beams emitted from second regions located between the two first regions adjacent to each other along a direction parallel to a first side in the first lens array among the first regions. The light control device blocks, when the brightness priority mode is selected, the plural partial light beams by causing the first light shields and the second light shields to integrally operate and always blocks, when the contrast priority mode is selected, the partial light beams emitted from the first regions with the first light shields and blocks the partial light beams emitted from the second regions by causing the second light shields to operate independently from the first light shields.

Therefore, with the projector according to the aspect of the invention, when the brightness priority mode is selected, it is possible to allow all the partial light beams passing through the second lens array to pass to realize a bright projection image. When the contrast priority mode is selected, it is possible to allow only the partial light beams passing through the center of the second lens array to pass to realize a high-contrast projection image.

The projector according to the aspect of the invention includes the light control device that increases or reduces a light amount of light irradiated on the light modulating device by blocking plural partial light beams with a light blocking amount corresponding to image information. The light control device includes the first light shields and the second light shields. The light control device blocks, when the brightness priority mode is selected, the plural partial light beams by causing the first light shields and the second light shields to integrally operate, always blocks, when the contrast priority mode is selected, the partial light beams emitted from the first regions with the first light shields, and blocks the partial light beams emitted from the second regions by causing the second light shields to operate independently from the first light shields. Therefore, even in the contrast priority mode, it is possible to block the plural partial light beams with the light blocking amount corresponding to the image information. As a result, it is possible to project, in both the brightness priority mode and the contrast priority mode, a projection image having a wide dynamic range.

In the projector according to the aspect of the invention, it is preferable that the mode selection device includes a mode selection switch for causing a user to select the brightness priority mode or the contrast priority mode.

With such a configuration, the user can select the brightness priority mode or the contrast priority mode as the user intends.

In the projector according to the aspect of the invention, it is preferable that the mode selection device includes a mode automatic selection device that selects the brightness priority mode or the contrast priority mode on the basis of information concerning light and shade of the projection image included in the image information.

With such a configuration, it is possible to automatically select the brightness priority mode or the contrast priority mode on the basis of details of content.

In the projector according to the aspect of the invention, it is preferable that the first light shields and the second light shields are configured to be rotatable around predetermined rotating shafts parallel to the first side in the first lens array and the light control device further includes a first rotation driving device and a second rotation driving device for rotating the first light shields and the second light shields around the rotating shafts independently from each other.

With such a configuration, it is possible to cause the first light shields and the second light shields to operate independently from each other.

In the projector according to the aspect of the invention, it is preferable that the first light shields and the second light shields are configured to be capable of advancing and retracting along a first direction perpendicular to the first side in the first lens array and the light control device further includes a first advance and retract driving device and a second advance and retract driving device for advancing and retracting the first light shields and the second light shields along the first direction independently from each other.

With such a configuration, it is also possible to cause the first light shields and the second light shields to operate independently from each other.

In the projector according to the aspect of the invention, it is preferable that the illuminating device further includes a superimposing leans for superimposing the partial light beams from the plural second small lenses in the illuminated region and a polarized-light converting device arranged between the second lens array and the superimposing lens.

With such a configuration, the illuminating device is suitable when the light modulating device is a liquid crystal light modulating device.

BRIEF DESCRIPTION OF THE DRAWINGS

The invention will be described with reference to the accompanying drawings, wherein like numbers reference like elements.

FIGS. 2A and 2B are diagrams for explaining a light control device 160 and a mode selection device 700 in the projector 1000 according to the first embodiment.

FIGS. 3A and 3B are diagrams of a first lens array 120 viewed from the light control device 160 side in the projector 1000 according to the first embodiment.

FIG. 6 is a diagram for explaining mode selection in the projector 1000 according to the first embodiment.

FIGS. 8A and 8B are diagrams for explaining a light control device 800 and a mode selection device 700 in a projector 1004 (not shown in the figure) according to a third embodiment of the invention.

FIGS. 9A and 9B are diagrams of the first lens array 120 viewed from the light control device 800 side in the projector 1004 according to the third embodiment.

DESCRIPTION OF EXEMPLARY EMBODIMENTS

Exemplary embodiments of the invention are explained below with reference to the accompanying drawings.
First Embodiment FIG. 1 is a top view for explaining an optical system of a projector 1000 according to a first embodiment of the invention.

In the following explanation, it is assumed that three directions orthogonal to one another are z axis direction (a direction of a system optical axis OC in FIG. 1), an x axis direction (a direction parallel to a paper surface in FIG. 1 and orthogonal to the z axis), and a y axis direction (a direction perpendicular to the paper surface in FIG. 1).

Figure 1:
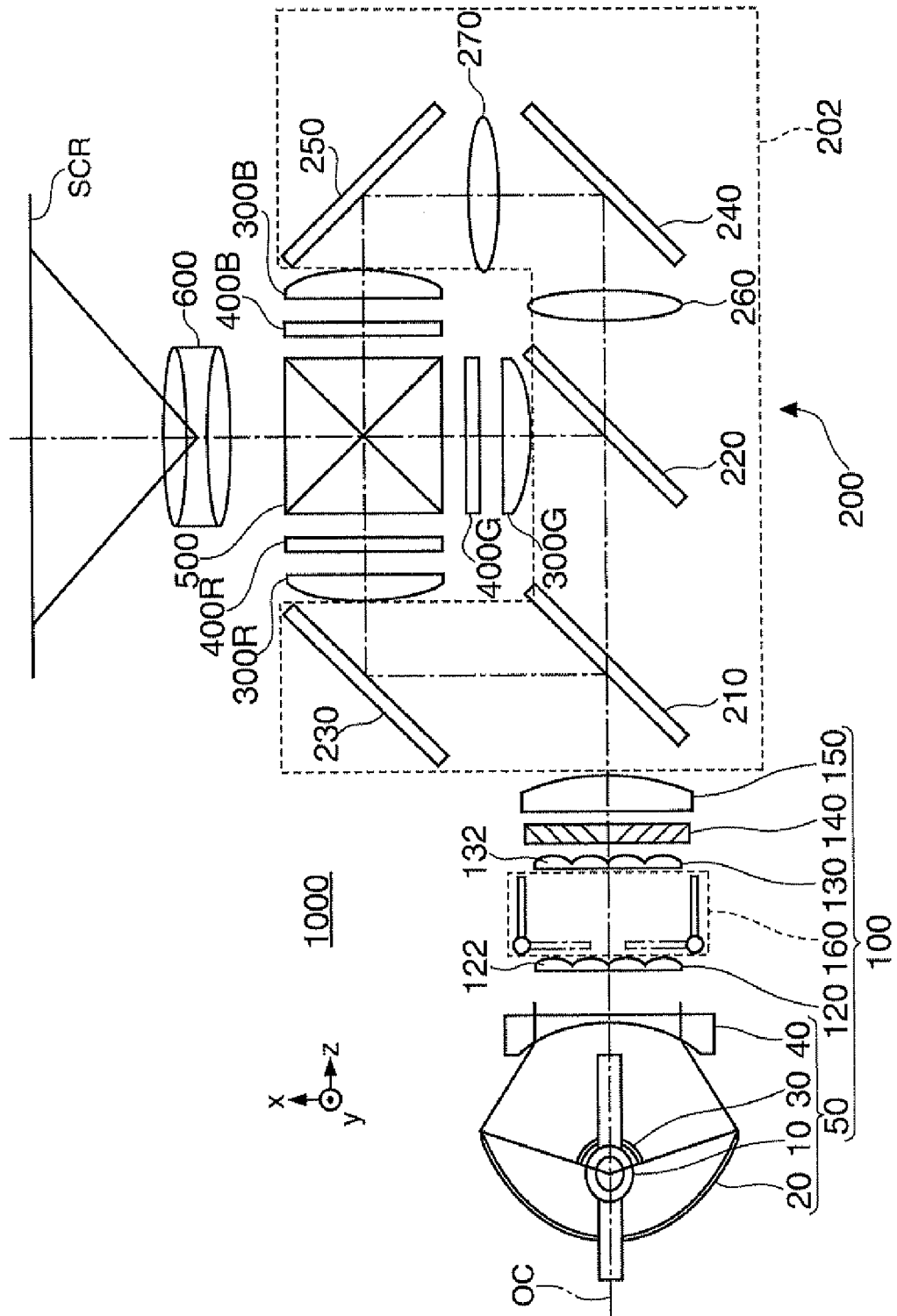
FIG. 1 is a top view for explaining an optical system of a projector 1000 according to a first embodiment of the invention.

The projector 1000 according to the first embodiment includes, as shown in FIG. 1, an illuminating device 100, a light modulating device 200, and a projection optical system 600.

The illuminating device 100 includes, as shown in FIG. 1, a light source device 50, a first lens array 120, a second lens array 130, a polarized-light converting device 140, and a superimposing lens 150.

The light source device 50 includes, as shown in FIG. 1, an arc tube 10, an elliptical reflector 20, a secondary mirror 30, and a concave lens 40. The light source device 50 emits light along the system optical axis OC.

The arc tube 10 includes, as shown in FIG. 1, a vessel section and a pair of sealing sections extending to both the side of the vessel section. Although explanation by illustration is omitted, the vessel section includes a pair of electrodes arranged in the vessel section, mercury, rare gas, and a small amount of halogen. When a potential difference occurs between the pair of electrodes, discharge occurs and an arc image is generated. This ark image is a light emitting section and located near a first focus of the elliptical reflector 20. The vessel section is made of, for example, quartz glass. As the arc tube 10, various arc tubes that emit light at high luminance can be adopted. For example, a metal halide lamp, a high pressure mercury lamp, an extra-high pressure mercury lamp, and the like can be adopted.

The elliptical reflector 20 includes, as shown in FIG. 1, an opening through which one sealing section of the arc tube 10 is inserted and fixed and a reflection surface that reflects light from the arc tube 10 to a second focus position.

The secondary mirror 30 is, as shown in FIG. 1, a reflection member that covers substantially a half of the vessel section of the arc tube 10 and are arranged to be opposed to the reflection surface of the elliptical reflector 20. The secondary mirror 30 is inserted and fixed to the other sealing section of the arc tube 10. The secondary mirror 30 reflects light, which is emitted from the arc tube 10 to the illuminated region side, to the elliptical reflector 20.

As shown in FIG. 1, the concave lens 40 is arranged on the illuminated region side of the elliptical reflector 20. The concave lens 40 is configured to convert light from the elliptical reflector 20 into substantially parallel rays.

The first lens array 120 includes, as shown in FIG. 1, plural first small lenses 122 having a function of a light beam dividing optical element that divides light emitted from the light source device 50 into plural partial light beams and arrayed in a matrix shape in a plane orthogonal to the system optical axis OC. Although explanation by illustration is omitted, an external shape of the first small lenses 122 is similar to an external shape of image forming regions of liquid crystal devices 400R, 400G, and 400B explained later.

The second lens array 130 is, as shown in FIG. 1, an optical element that condenses plural partial light beams divided by the first lens array 120. Like the first lens array 120, the second lens array 130 includes plural second small lenses 132 arrayed in a matrix shape in a plane orthogonal to the system optical axis OC.

The polarized-light converting device 140 is a polarized-light converting element that emits the partial light beams, which are divided by the first lens array 120, as generally one kind of linear polarized light with polarization directions thereof aligned.

Although detailed explanation by illustration is omitted, the polarized-light converting device 140 includes a polarized light separation layer that directly transmits one linear polarized light component of polarized light components included in an illumination light beam from the light source device 50 and reflects the other linear polarized light component in a direction orthogonal to the system optical axis OC (the x axis direction), a reflection layer that reflects the other linear polarized light component reflected by the polarized light separation layer in a direction parallel to the system optical axis OC (the z axis direction), and a phase difference plate that converts the other linear polarized light component reflected by the reflection layer into one linear polarized light component.

The superimposing lens 150 is an optical element for condensing plural partial light beams transmitted through the first lens array 120, the second lens array 130, and the polarized-light converting device 140 and superimposing the partial light beams near image forming regions in liquid crystal devices 400R, 400G, and 400B. The superimposing lens 150 shown in FIG. 1 includes one lens. However, the superimposing lens 150 may include a compound lens obtained by combining plural lenses.

As shown in FIG. 1, a light control device 160 is disposed in an optical path between the first lens array 120 and the second lens array 130. Details of the light control device 160 are explained later.

The light modulating device 200 includes a color-separation and light-guide optical system 202, three liquid crystal devices 400R, 400G, and 400B, and a cross-dichroic prism 500. The light modulating device 200 modulates illumination light from the illuminating device 100 according to image information.

The color-separation and light-guide optical system 202 includes, as shown in FIG. 1, dichroic mirrors 210 and 220, reflection mirrors 230, 240, and 250, and relay lenses 260 and 270. The color-separation and light-guide optical system 202 has a function of separating illumination light emitted from the illuminating device 100 into three color lights, i.e., red light, green light, and blue light and guiding the color lights to the liquid crystal devices 400R, 400G, and 400B as illumination targets, respectively.

The dichroic mirrors 210 and 220 are optical elements in which wavelength selecting films that reflect light beams in a predetermined wavelength region and transmit light beams in other wavelength regions are formed on substrates. The dichroic mirror 210 arranged at a pre-stage of an optical path is a mirror that reflects a red light component and transmits other color light components. The dichroic mirror 220 arranged at a post-stage of the optical path is a mirror that reflects a green light component and transmits a blue light component.

The red light component reflected by the dichroic mirror 210 is bent by the reflection mirror 230 and made incident on the image forming region of the liquid crystal device 400R for red light via a condensing lens 300R.

The condensing lens 300R is provided to convert partial light beams from the superimposing lens 150 into light beams substantially parallel to principal rays. Condensing lenses 300G and 300E disposed at pre-stages of optical paths of the other liquid crystal devices 400G and 400B are configured the same as the condensing lens 300R.

The green light component of the green and blue light components transmitted through the dichroic mirror 210 is reflected by the dichroic mirror 220, passes through the condensing lens 300G, and is made incident on the image forming region of the liquid crystal device 400G for green light. On the other hand, the blue light component is transmitted through the dichroic mirror 220, passes through the relay lens 260, the reflection mirror 240 on the incidence side, the relay lens 270, the reflection mirror 250 on the emission side, and the condensing lens 300B, and is made incident on the image forming region of the liquid crystal device 400B for blue light. The relay lenses 260 and 270 and the reflection mirrors 240 and 250 have a function of guiding the blue light component transmitted through the dichroic mirror 220 to the liquid crystal device 400B.

Such relay lenses 260 and 270 and reflection mirrors 240 and 250 are provided in the optical path for blue light in order to prevent a fall in light use efficiency due to divergence or the like of light because the length of the optical path for blue light is larger than the length of the optical paths for the other color lights. The projector 1000 according to the first embodiment is configured in this way because the length of the optical path for blue light is large. However, it is also conceivable to set the length of the optical path for red light large and use the relay lenses 260 and 270 and the reflection mirrors 240 and 250 for the optical path for red light.

The liquid crystal devices 400R, 400G, and 400B modulate incident illumination light beams according to image information and form color images. The liquid crystal devices 400R, 400G, and 400B are illumination targets of the illuminating device 100. Although not shown in the figure, incidence side sheet polarizers are respectively arranged between the condensing lenses 300R, 300G, and 300B and the liquid crystal devices 400R, 400G, and 400B. Emission side sheet polarizers are respectively arranged between the liquid crystal devices 400R, 400G, and 400B and the cross-dichroic prism 500. Light modulation for incident color lights is performed by the incidence side sheet polarizers, the liquid crystal devices 400R, 400G, and 400B, and the emission side sheet polarizers.

The liquid crystal devices 400R, 400B, and 400B are obtained by enclosing liquid crystal as an electro-optic substance in a pair of transparent glass substrates. The liquid crystal devices 400R, 400B, and 400B modulate, according to a given image signal a polarization direction of one kind of linear polarized light emitted from the incidence side sheet polarizers using, for example, a polysilicon TFT as a switching element.

The cross-dichroic prism 500 is an optical element that combines optical images modulated for the respective colors emitted from the emission side sheet polarizers to form a color image. The cross-dichroic prism 500 is formed in a substantially square shape in plan view obtained by bonding four rectangular prisms. Dielectric multi-layer films are formed on interfaces of a substantial X shape on which the rectangular prisms are bonded. The dielectric multi-layer film formed on one interface of the substantial X shape reflects the red light. The dielectric multi-layer film formed on the other interface reflects the blue light. The red light and the blue light are bent by these dielectric multi-layer films to be aligned with a traveling direction of the green light, whereby the three color lights are combined.

The color image emitted from the cross-dichroic prism 500 is enlarged and projected by the projection optical system 600 and forms an image on a screen SCR.

The light control device 160 and a mode selection device 700 in the projector 1000 according to the first embodiment are explained in detail below.

FIGS. 2A and 2B are diagrams for explaining the light control device 160 and the mode selection device 700 in the projector 1000 according to the first embodiment. FIG. 2A is a diagram of a state in which the light control device 160 does not perform reduction of the light. FIG. 2B is a diagram of a state in which the light control device 160 performs reduction of the light.

FIGS. 3A and 3B are diagrams of the first lens array 120 viewed from the light control device 160 side in the projector 1000 according to the first embodiment. FIG. 3A is a diagram of a state corresponding to FIG. 2A. FIG. 3B is a diagram of a state corresponding to FIG. 2B.

FIGS. 2A and 2B and FIGS. 3A and 3B are diagrams of a state in which the projector 1000 operates in the brightness priority mode.

Figure 4B:
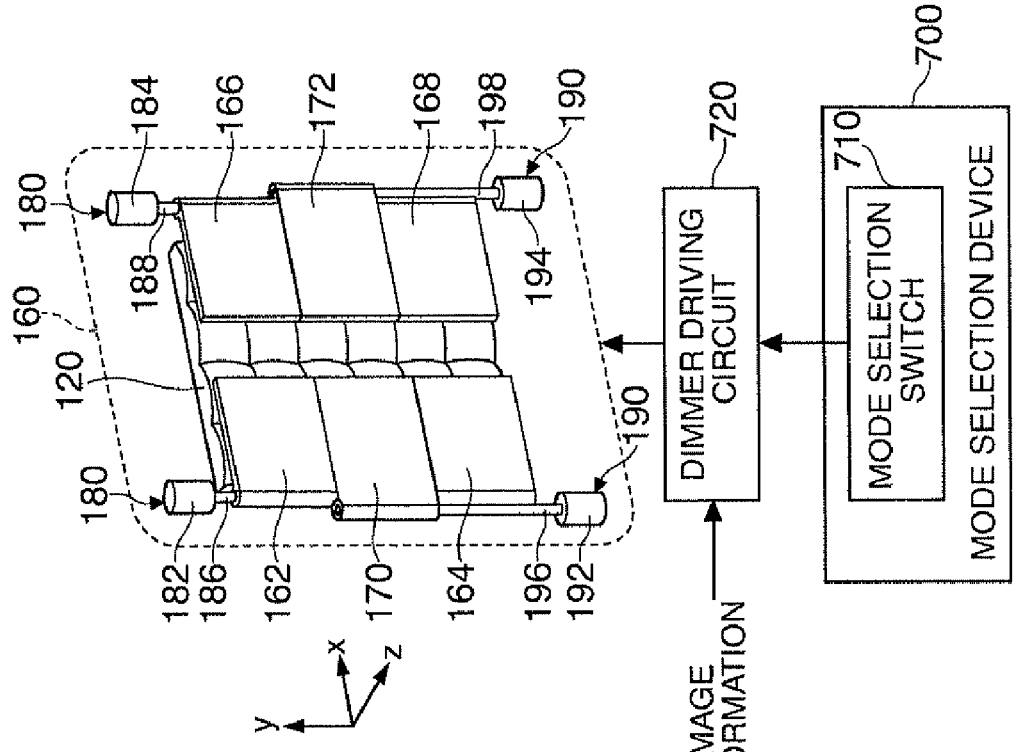
FIGS. 4A and 4B are diagrams for explaining the light control device 160 and the mode selection device 700 in the projector 1000 according to the first embodiment.
Figure 4A:
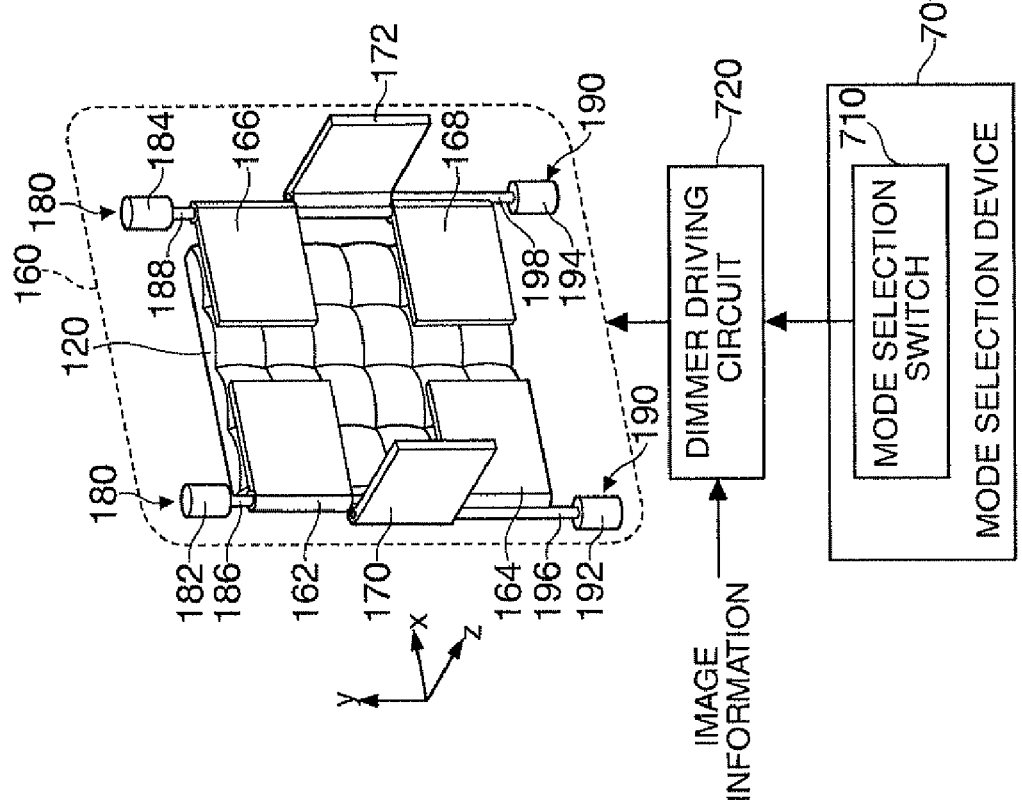

FIGS. 4A and 4B are diagrams for explaining the light control device 160 and the mode selection device 700 in the projector 1000 according to the first embodiment. FIG. 4A is a diagram of a state in which the light control device 160 does not perform reduction of the light. FIG. 4B is a diagram of a state in which the light control device 160 performs reduction of the light.

Figure 5A:
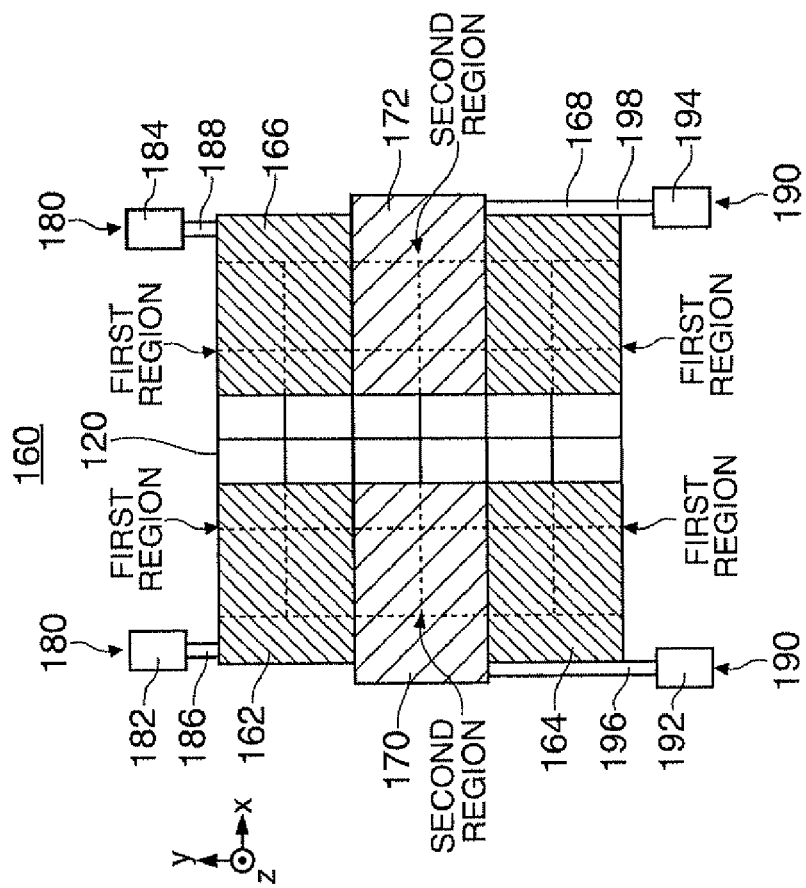
FIGS. 5A and 5B are diagrams of the first lens array 120 viewed from the light control device 160 side in the projector 1000 according to the first embodiment.
Figure 5B:
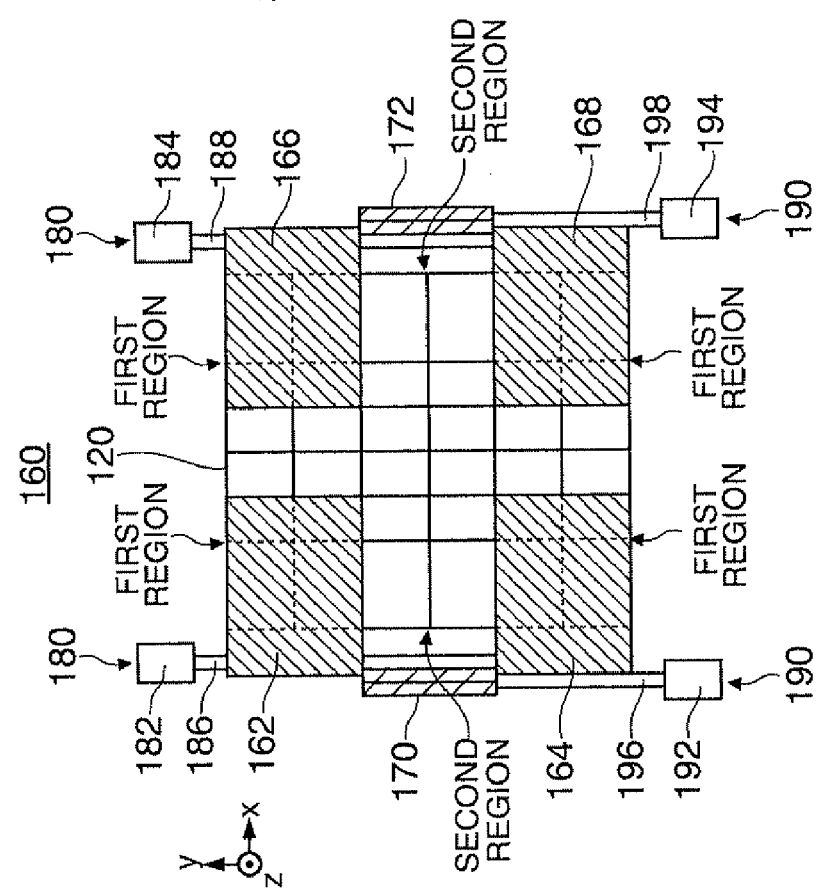

FIGS. 5A and 5B are diagrams of the first lens array 120 viewed from the light control device 160 side in the projector 1000 according to the first embodiment. FIG. 5A is a diagram of a state corresponding to FIG. 4A. FIG. 5B is a diagram of a state corresponding to FIG. 4B.

FIGS. 4A and 4B and FIGS. 5A and 5B are diagrams of a state in which the projector 1000 operates in the contrast priority mode.

FIG. 6 is a diagram for explaining the brightness priority mode and the contrast priority mode in the projector 1000 according to the first embodiment. In FIG. 6, a single circle indicates that a mode is excellent in an item marked by the single circle and a double circle indicates that a mode is excellent in an item marked by the double circle.

The projector 1000 according to the first embodiment further includes, as shown in FIGS. 2A and 2B and FIGS. 4A and 4B, the mode selection device 700 and a light control device driving circuit 720.

The light control device 160 includes, as shown in FIG. 1 to FIGS. 5A and 5B, first light shields 162, 164, 166, and 168, second light shields 170 and 172, a first rotation driving device 180, and a second rotation driving device 190. The light control device 160 dynamically increases or reduces a light amount of light irradiated on the light modulating device 200 by dynamically blocking plural partial light beams with a light blocking amount corresponding to image information.

As shown in FIGS. 2A and 2B to FIGS. 5A and 5B, the first light shields 162, 164, 166, and 168 block partial light beams emitted from four first regions located at four corners in the first lens array when viewed along a system optical axis. The first light shields 162 and 164 are respectively fixed to a first rotating shaft 186 on sides thereof located on a rotation axis along the y axis direction and configured to be rotatable around the first rotating shaft 186. The first light shields 166 and 168 are respectively fixed to a first rotating shaft 188 on sides thereof located on a rotation axis along the y axis direction and configured to be rotatable around the first rotating shaft 188.

As shown in FIGS. 2A and 2B to FIGS. 5A and 5B, the second light shields 170 and 172 block partial light beams emitted from two second regions located between the two first regions adjacent to each other along the y axis direction among the four first regions. The second light shield 170 is fixed to a second rotating shaft 196 on a side thereof on a rotation axis along the y axis direction and configured to be rotatable around the second rotating shaft 196. The second light shield 172 is fixed to a second rotating shaft 198 on a side thereof on a rotation axis along the y axis direction and configured to be rotatable around the second rotating shaft 198.

The area and the arrangement of the respective light shields shown in FIGS. 2A and 2B to FIGS. 5A and 5B are examples only. Optimum area and arrangement in a projector to which the invention is applied can be selected.

The first rotation driving device 180 includes first driving device 182 and 184 and the first rotating shafts 186 and 188.

As shown in FIGS. 2A and 2B to FIGS. 5A and 5B, the first rotating shaft 186 is located on the rotation axes of the first light shields 162 and 164 and connects the first light shields 162 and 164 and the first driving device 182. As shown in FIGS. 2A and 2B to FIGS. 5A and 5B, the first rotating shaft 188 is located on the rotation axes of the first light shields 166 and 168 and connects the first light shields 166 and 168 and the first driving device 184.

As shown in FIGS. 2A and 2B to FIGS. 5A and 5B, the first driving devices 182 and 184 rotate the first rotating shafts 186 and 188 to thereby rotate the first light shields 162, 164, 166, and 168. As the first driving devices 182 and 184, for example, a stepping motor can be used.

The second rotation driving device 190 includes second driving devices 192 and 194 and the second rotating shafts 196 and 198.

As shown in FIGS. 2A and 2B to FIGS. 5A and 5B, the second rotating shaft 196 is located on the rotation axis of the second light shield 170 and connects the second light shield 170 and the second driving device 192. As shown in FIGS. 2A and 2B to FIGS. 5A and 5B, the second rotating shaft 198 is located on the rotation axis of the second light shield 172 and connects the second light shield 172 and the second driving device 194.

As shown in FIGS. 2A and 2B to FIGS. 5A and 5B, the second driving devices 192 and 194 rotate the second rotating shafts 196 and 198 to thereby rotate the second light shields 170 and 172. As the second driving devices 192 and 194, for example, a stepping motor can be used.

As shown in FIGS. 2A and 2B to FIGS. 5A and 5B, the first rotation driving device 180 and the second rotation driving device 190 respectively rotate the first light shields 162, 164, 166, and 168 and the second light shields 170 and 172 independently from each other.

As shown in FIGS. 2A and 2B and FIGS. 3A and 3B, when the brightness priority mode is selected by the mode selection device 700, the light control device 160 dynamically blocks plural partial light beams by causing the first light shields 162, 164, 166, and 168 and the second light shields 170 and 172 to integrally operate. As shown in FIGS. 4A and 4B and FIGS. 5A and 5B, when the contrast priority mode is selected by the mode selection device 700, the light control device 160 always blocks partial light beams emitted from the first regions with the first light shields 162, 164, 166, and 168 and dynamically blocks partial light beams emitted from the second regions by causing the second light shields 170 and 172 to operate independently from the first light shields 162, 164, 166, and 168. An amount of blocking of partial light beams by the light control device 160 may be determined stepwise or may be determined non-stepwise.

The mode selection device 700 includes a mode selection switch 710. The mode selection device 700 selects, according to the mode selection switch 710, in which of the brightness priority mode and the contrast priority mode the light control device 160 should be caused to operate.

As shown in FIG. 6, the brightness priority mode is particularly excellent in projection of a bright projection image and can be suitably used, for example, when surroundings of a place where a projection image is projected are bright.

As shown in FIG. 6, the contrast priority mode is particularly excellent in projection of a high-contrast projection image and can be suitably applied, for example, when a projection image originally having high contrast is projected.

The mode selection switch 710 is a switch for causing a user to select the brightness priority mode and the contrast priority mode.

The light control device driving circuit 720 controls driving of the light control device 160. Although detailed explanation by illustration is omitted, the light control device driving circuit 720 obtains, as information, a signal from the mode selection device 700 and a signal from image information. The light control device driving circuit 720 drives the light control device 160 on the basis of the information.

As explained above, the projector 1000 according to the first embodiment includes the illuminating device 100, the light modulating device 200, the projection optical system 600, the light control device 160, and the mode selection device 700.

Therefore, with the projector 1000 according to the first embodiment, when the brightness priority mode is selected, it is possible to allow all partial light beams passing through the second lens array 130 to pass to realize a bright projection image. When the contrast priority mode is selected, it is possible to allow only partial light beams passing through the center of the second lens array 130 to pass to realize a high-contrast projection image.

The projector 1000 according to the first embodiment includes the light control device 160 that increases or reduces a light amount of light irradiated on the light modulating device 200 by blocking plural partial light beams with a light blocking amount corresponding to image information. The light control device 160 includes the first light shields 162, 164, 166, and 168 and the second light shields 170 and 172. When the brightness priority mode is selected, the light control device 160 blocks plural partial light beams by causing the first light shields 162, 164, 166, and 168 and the second light shields 170 and 172 to integrally operate. When the contrast priority mode is selected, the light control device 160 always blocks partial light beams emitted from the first regions with the first light shields 162, 164, 166, and 168 and blocks partial light beams emitted from the second regions by causing the second light shields 170 and 172 to operate independently from the first light shields 162, 164, 166, and 168. Therefore, even in the contrast priority mode, it is possible to block plural partial light beams with a light blocking amount corresponding to image information. As a result, it is possible to project, in both the brightness priority mode and the contrast priority mode, a projection image having a wide dynamic range.

With the projector 1000 according to the first embodiment, the mode selection device 700 includes the mode selection switch 710 for causing the user to select the brightness priority mode or the contrast priority mode. Therefore, the user can select the brightness priority mode or the contrast priority mode as the user intends.

With the projector 1000 according to the first embodiment, the first light shields 162, 164, 166, and 168 and the second light shields 170 and 172 are configured to be rotatable around a predetermined rotation axis parallel to a first side (the y axis direction) in the first lens array 120. The light control device 160 includes the first rotation driving device 166 and the second rotation driving device 168 for rotating the first light shields 162, 164, 166, and 168 and the second light shields 170 and 172 independently from each other. Therefore, it is possible to cause the first light shields 162, 164, 166, and 168 and the second light shields 170 and 172 to operate independently from each other.

With the projector 1000 according to the first embodiment, the illuminating device 100 includes the superimposing lens 150 and the polarized-light converting device 140. Therefore, the illuminating device 100 is suitable when the light modulating device 200 is a liquid crystal light modulating device.

Second Embodiment

Figure 7:
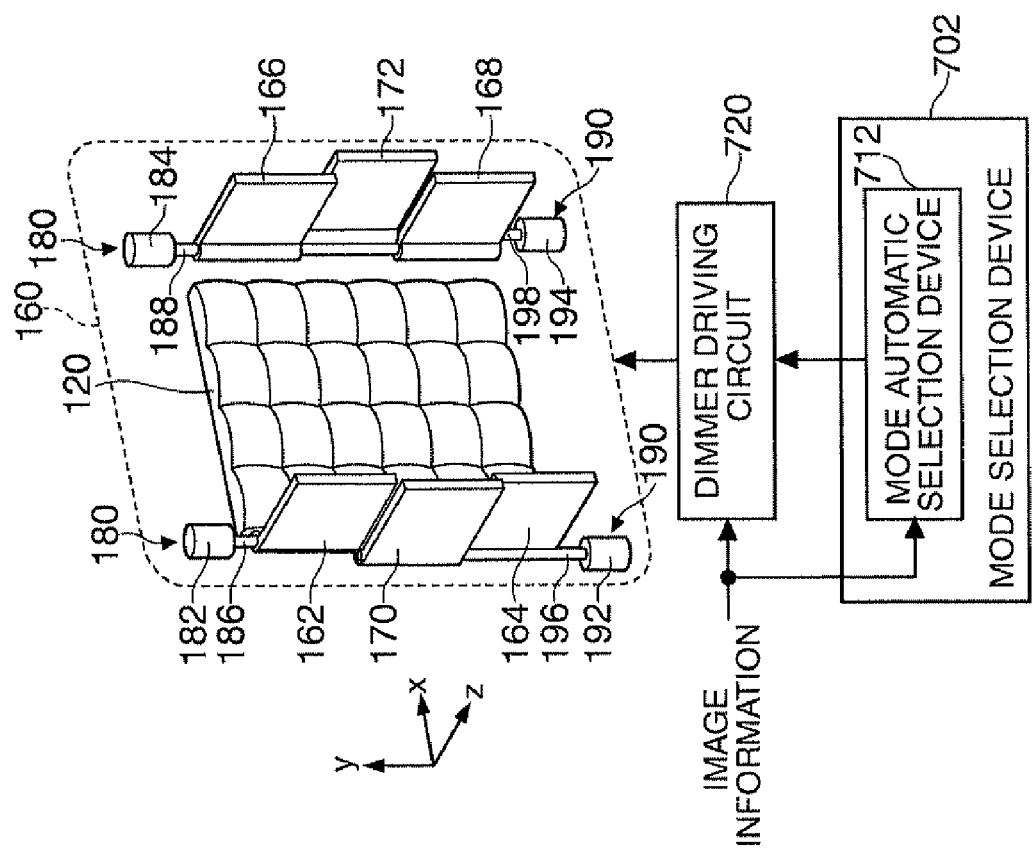
FIG. 7 is a diagram for explaining the light control device 160 and a mode selection device 702 in a projector 1002 (not shown in the figure) according to a second embodiment of the invention.

FIG. 7 is a diagram for explaining the light control device 160 and a mode selection device 702 in a projector 1002 (not shown in the figure) according to a second embodiment of the invention. FIG. 7 is a diagram of a state in which the projector 1002 operates in the brightness priority mode and the light control device 160 does not perform reduction of the light.

The projector 1002 according to the second embodiment basically has a configuration same as that of the projector 1000 according to the first embodiment. However, a configuration of a mode selection device is different from that of the projector 1000 according to the first embodiment. In the projector 1002 according to the second embodiment, as shown in FIG. 7, the mode selection device 702 includes a mode automatic selection device 712 that selects the brightness priority mode or the contrast priority mode on the basis of information concerning light and shade of a projection image included in image information.

In this way, the projector 1002 according to the second embodiment is different from the projector 1000 according to the first embodiment in the configuration of the mode selection device. However, the projector 1002 includes the light control device 160 that increases and reduces a light amount of light irradiated on the light modulating device 200 by blocking plural partial light beams with a light blocking amount corresponding to image information and the mode selection device 702 that selects in which of the brightness priority mode and the contrast priority mode the light control device 160 should be caused to operate. The light control device 160 includes the first light shields 162, 164, 166, and 168 and the second light shields 170 and 172. When the brightness priority mode is selected, the light control device 160 blocks plural partial light beams by causing the first light shields 162, 164, 166, and 168 and the second light shields 170 and 172 to integrally operate. When the contrast priority mode is selected, the light control device 160 always blocks partial light beams emitted from the first regions with the first light shields 162, 164, 166, and 168 and blocks partial light beams emitted from the second regions by causing the second light shields 170 and 172 to operate independently from the first light shields 162, 164, 166, and 168. Therefore, like the projector 1000 according to the first embodiment, the projector 1002 can select the brightness priority mode and the contrast priority mode and can project, in both the modes, a projection image having a wide dynamic range.

With the projector 1002 according to the second embodiment, the mode selection device 702 includes the mode automatic selection device 712 that selects the brightness priority mode or the contrast priority mode on the basis of information concerning light and shade of a projection image included in image information. Therefore, it is possible to automatically select the brightness priority mode or the contrast priority mode on the basis of details of content.

The projector 1002 according to the second embodiment has the configuration same as that of the projector 1000 according to the first embodiment except the configuration of the mode selection device. Therefore, the projector 1002 has those effects corresponding to the configuration thereof among the effects of the projector 1000 according to the first embodiment.

Third Embodiment

FIGS. 8A and 8B are diagrams for explaining a light control device 800 and the mode selection device 700 in a projector 1004 (not shown in the figure) according to a third embodiment of the invention. FIG. 8A is a diagram of a state in which the light control device 800 does not perform reduction of the light. FIG. 8B is a diagram of a state in which the light control device 800 performs reduction of the light.

FIGS. 9A and 9B are diagrams of the first lens array 120 viewed from the light control device 800 side in the projector 1004 according to the third embodiment. FIG. 9A is a diagram of a state corresponding to FIG. 8A. FIG. 9B is a diagram of a state corresponding to FIG. 8B.

FIGS. 8A and 8B and FIGS. 9A and 9B are diagrams of a state in which the projector 1004 operates in the brightness priority mode.

Figure 10A:
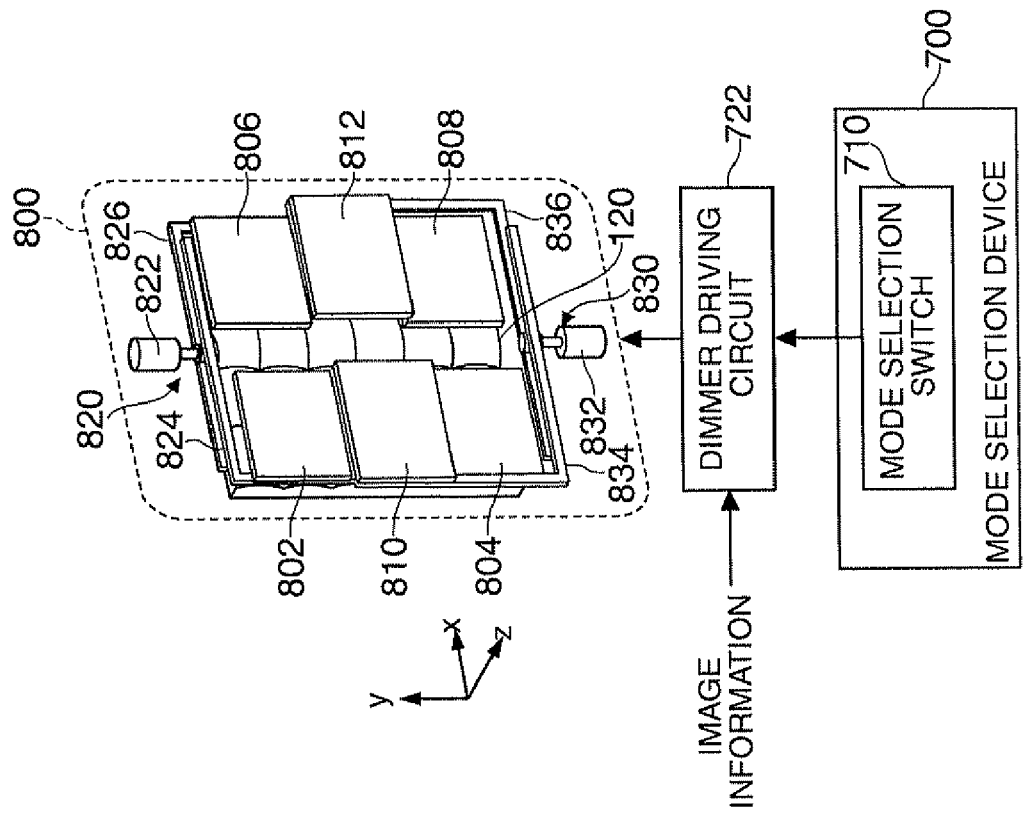
FIGS. 10A and 10B are diagrams for explaining the light control device 800 and the mode selection device 700 in the projector 1004 according to the third embodiment.
Figure 10B:
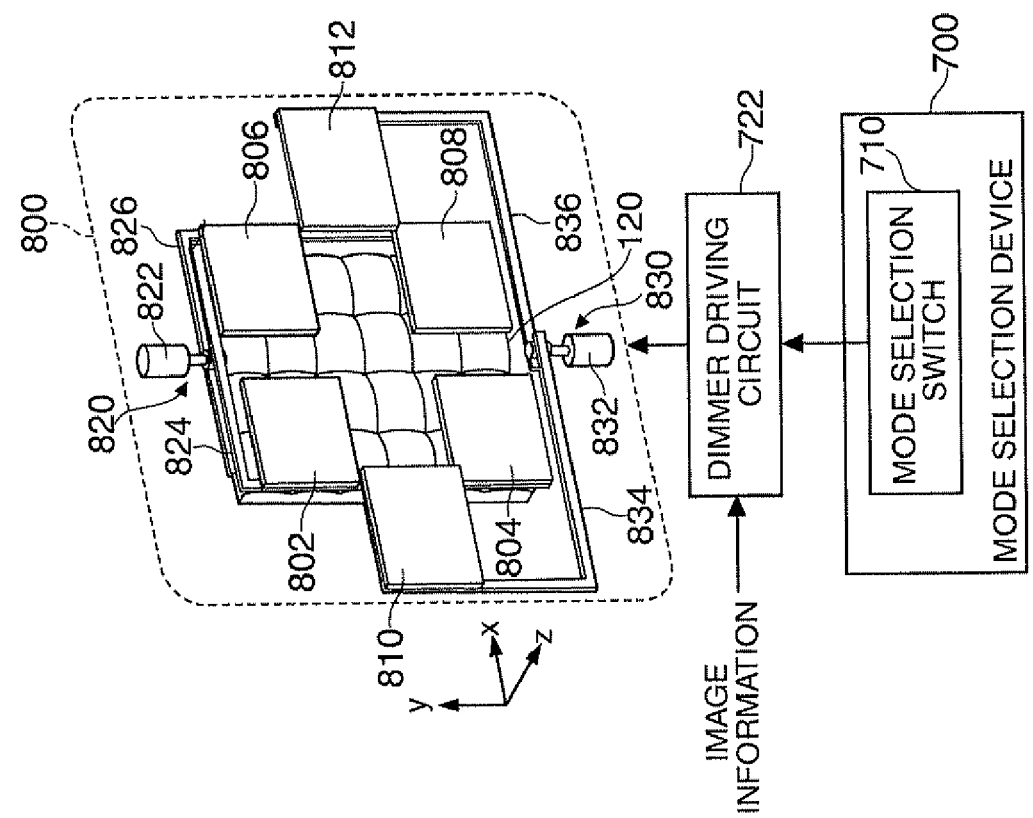

FIGS. 10A and 10B are diagrams for explaining the light control device 800 and the mode selection device 700 in the projector 1004 according to the third embodiment. FIG. 10A is a diagram of a state in which the light control device 800 does not perform reduction of the light. FIG. 10B is a diagram of a state in which the light control device 800 performs reduction of the light.

Figures 11A, 11B:
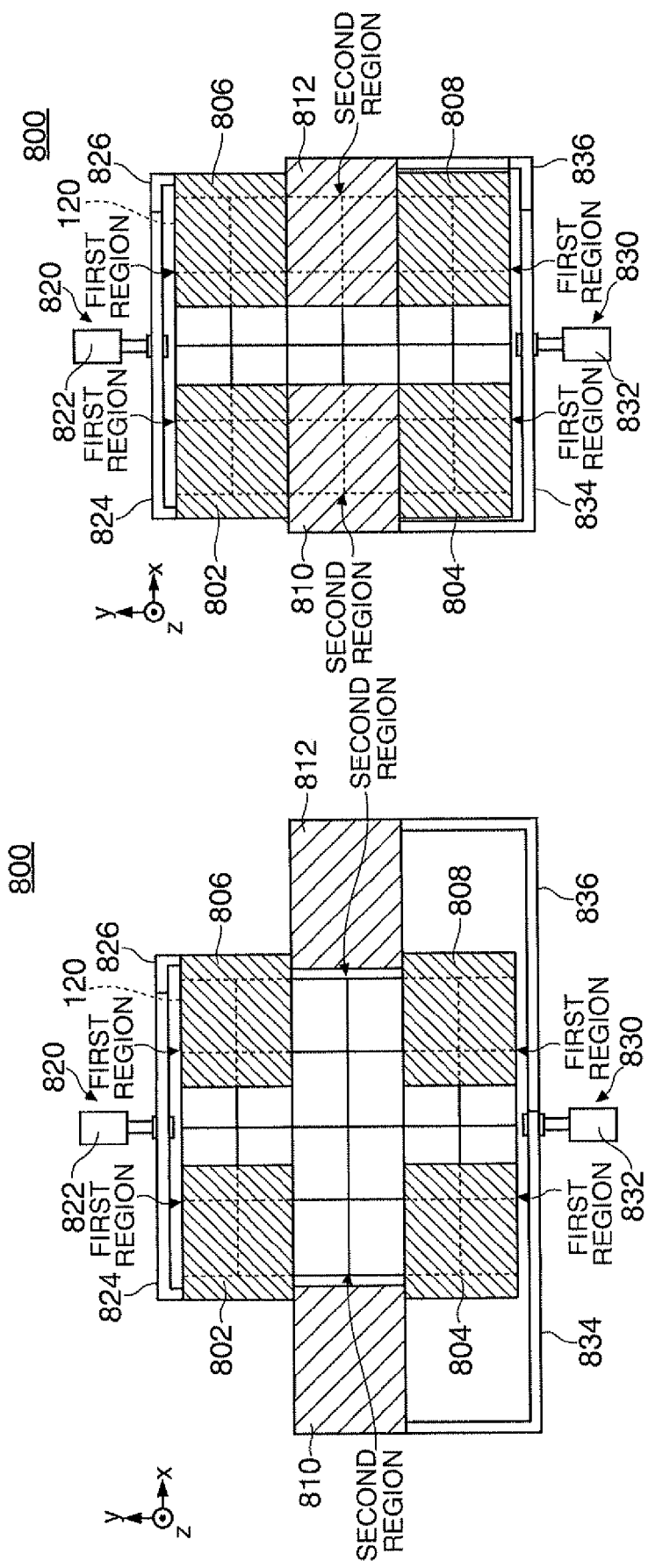
FIGS. 11A and 11B are diagrams of the first lens array 120 viewed from the light control device 800 side in the projector 1004 according to the third embodiment.

FIGS. 11A and 11B are diagrams of the first lens array 120 viewed from the light control device 800 side in the projector 1004 according to the third embodiment. FIG. 11A is a diagram of a state corresponding to FIG. 10A. FIG. 11B is a diagram of a state corresponding to FIG. 10B.

FIGS. 10A and 10B and FIGS. 11A and 11B are diagrams of a state in which the projector 1004 operates in the contrast priority mode.

The projector 1004 according to the third embodiment basically has a configuration same as that of the projector 1000 according to the first embodiment. However, the projector 1004 is different from the projector 1000 according to the first embodiment in the configuration of the light control device. Specifically, the projector 1004 according to the third embodiment includes, as shown in FIGS. 8A and 8B to FIGS. 11A and 11B, the light control device 800 of a so-called translation type. According to the difference in the configuration of the light control device, the projector 1004 according to the third embodiment is different from the projector 1000 according to the first embodiment in the configuration of the light control device driving circuit.

The light control device 800 includes, as shown in FIGS. 8A and 8B to FIGS. 11A and 11B, first light shields 802, 804, 806, and 808, second light shields 810 and 812, a first advance and retract driving device 820, and a second advance and retract driving device 830. The light control device 800 dynamically increases or reduces a light amount of light irradiated on the light modulating device 200 by dynamically blocking plural partial light beams with a light blocking amount corresponding to image information.

As shown in FIGS. 8A and 8E to FIGS. 11A and 11B, the light shields 802, 804, 806, and 808 block partial light beams emitted from four first regions located at four corners in the first lens array when viewed along a system optical axis. The first light shields 802 and 804 are respectively fixed to a first moving shaft 824 on one sides thereof and configured to be capable of advancing and retracting in an x axis direction. The first light shields 806 and 808 are respectively fixed to a first moving shaft 826 on one sides thereof and configured to be capable of advancing and retracting along the x axis direction.

As shown in FIGS. 8A and 8B to FIGS. 11A and 11B, the second light shields 810 and 812 block partial light beams emitted from two second regions located between the two first regions adjacent to each other along a y axis direction among the four first regions. The second light shield 810 is fixed to a second moving shaft 834 on one side thereof and configured to be capable of advancing and retracting along the x axis direction. The second light shield 812 is fixed to a second moving shaft 836 on one side thereof and configured to be capable of advancing and retracting along the x axis direction.

The area and the arrangement of the respective light shields shown in FIGS. 8A and 8B to FIGS. 11A and 11B are examples only. Optimum area and arrangement in a projector to which the invention is applied can be selected.

The first advance and retract driving device 820 includes a first driving device 822 and the first moving shafts 824 and 826.

As shown in FIGS. 8A and 8B to FIGS. 11A and 11B, the first moving shaft 824 supports one sides of the first light shields 802 and 804 and is capable of advancing and retracting along the x axis direction with driving force from a rotating unit of the first driving device 822. As shown in FIGS. 8A and 8B to FIGS. 11A and 113, the first moving shaft 826 supports one sides of the first light shields 806 and 808 and is capable of advancing and retracting along the x axis direction with driving force from the rotating unit of the first driving device 822.

As shown in FIGS. 8A and 83 to FIGS. 11A and 113, the rotating unit of the first driving device 822 is set in contact with the first moving shafts 824 and 826. The first driving device 822 rotates the rotating unit to generate driving force for the first moving shafts 824 and 826 and causes the first light shields 802, 804, 806, and 808 to advance and retract along the x axis direction. In contact sections of the rotating unit of the first driving device 822 and the first moving shafts 824 and 826, for example, a system for converting rotation into driving force making use of frictional force and a system for converting rotation into driving force by meshing a rack and a gear can be used. As the first driving device 822, for example, a stepping motor can be used.

The second advance and retract driving device 830 includes a second driving device 832 and the second moving shafts 834 and 836.

As shown in FIGS. 8A and 8B to FIGS. 11A and 11B, the second moving shaft 834 supports one side of the second light shield 810 and is capable of advancing and retracting along the x axis direction with driving force from a rotating unit of the second driving device 832. As shown in FIGS. 8A and 8B to FIGS. 11A and 11B, the second moving shaft 836 supports one side of the second light shield 812 and is capable of advancing and retracting along the x axis direction with driving force from the rotating unit of the second driving device 832.

As shown in FIGS. 8A and 8B to FIGS. 11A and 11B, the rotating unit of the second driving device 832 is set in contact with the second moving shafts 834 and 836. The second driving device 832 rotates the rotating unit to generate driving force for the second moving shafts 834 and 836 and causes the second light shields 810 and 812 to advance and retract along the x axis direction. In contact sections of the rotating unit of the second driving device 832 and the second moving shafts 834 and 836, for example, a system for converting rotation into driving force making use of frictional force and a system for converting rotation into driving force by meshing a rack and a gear can be used. As the second driving device 832, for example, a stepping motor can be used.

As shown in FIGS. 8A and 8B to FIGS. 11A and 11B, the first advance and retract driving device 822 and the second advance and retract driving device 832 cause the first light shields 802, 804, 806, and 808 and the second light shields 810 and 812 to advance and retract along the x axis direction independently from each other.

As shown in FIGS. 8A and 8B and FIGS. 9A and 9B, when the brightness priority mode is selected by the mode selection device 700, the light control device 800 dynamically blocks plural partial light beams by causing the first light shields 802, 804, 806, and 808 and the second light shields 810 and 812 to integrally operate. As shown in FIGS. 10A and 10B and FIGS. 11A and 11B, when the contrast priority mode is selected by the mode selection device 700, the light control device 800 always blocks partial light beams emitted from the first regions with the first light shields 802, 804, 806, and 808 and dynamically blocks partial light beams emitted from the second regions by causing the second light shields 810 and 812 to operate independently from the first light shields 802, 804, 806, and 808. An amount of blocking of partial light beams by the light control device 800 may be determined stepwise or may be determined non-stepwise.

A light control device driving circuit 722 controls driving of the light control device 800. Although detailed explanation by illustration is omitted, the light control device driving circuit 722 obtains, as information, a signal from the mode selection device 700 and a signal from image information. The light control device driving circuit 722 drives the light control device 800 on the basis of the information.

As explained above, the projector 1004 according to the third embodiment is different from the projector 1000 according to the first embodiment in the configurations of the light control device and the light control device driving circuit. However, the projector 1004 includes the light control device 800 that increases or reduces a light amount of light irradiated on the light modulating device 200 by blocking plural partial light beams with a light blocking amount corresponding to image information and the mode selection device 700 that selects in which of the brightness priority mode and the contrast priority mode the light control device 800 should be caused to operate. The light control device 800 includes the first light shields 802, 804, 806, and 808 and the second light shields 810 and 812. When the brightness priority mode is selected, the light control device 800 blocks plural partial light beams by causing the first light shields 802, 804, 806, and 808 and the second light shields 810 and 812 to integrally operate. When the contrast priority mode is selected, the light control device 800 always blocks partial light beams emitted from the first regions with the first light shields 802, 804, 806, and 808 and blocks partial light beams emitted from the second regions by causing the second light shields 810 and 812 to operate independently from the first light shields 802, 804, 806, and 808. Therefore, like the projector 1000 according to the first embodiment, the projector 1004 can select the brightness priority mode and the contrast priority mode and can project, in both the modes, a projection image having a wide dynamic range.

With the projector 1004 according to the third embodiment, the first light shields 802, 804, 806, and 808 and the second light shields 810 and 812 are configured to be capable of advancing and retracting along the x axis direction and the light control device 800 includes the first advance and retract driving device 820 and the second advance and retract driving device 830 for causing the first light shields 802, 804, 806, and 808 and the second light shields 810 and 812 to advance and retract along the x axis direction independently from each other. Therefore, it is possible to cause the first light shields 802, 804, 806, and 808 and the second light shields 810 and 812 to operate independently from each other.

The projector 1004 according to the third embodiment has the configuration same as that of the projector 1000 according to the first embodiment except the configurations of the light control device and the like. Therefore, the projector 1004 has those effects corresponding to the configuration thereof among the effects of the projector 1000 according to the first embodiment.

The projectors according to the embodiments of the invention are explained above. However, the invention is not limited to the embodiments. The invention can be carried out in various forms without departing from the spirit of the invention. For example, modifications explained below are also possible.

(1) In the embodiments, the transmissive projectors 1000, 1002, and 1004 are used. However, the invention is not limited to this. For example, a reflective projector may be used. "Transmissive" means that a light modulating device as light modulating means is a type for transmitting light like a transmissive liquid crystal display device. "Reflective" means that a light modulating device as light modulating means is a type for reflecting light like a reflective liquid crystal display device. When the invention is applied to the reflective projector, it is possible to obtain effects same as those of the transmissive projector.

(2) In the embodiments, the liquid crystal devices are used as the light modulating devices of the projectors 1000, 1002, and 1004. However, the invention is not limited to this. In general, a light modulating device only has to modulate incident light according to image information. A micromirror light modulating device or the like may be used. As the micromirror light modulating device, for example, a DMD (digital micromirror device) (a trademark of Texas Instruments Incorporated) can be used.

(3) In the embodiments, the light source device including the elliptical reflector 20 is used. However, the invention is not limited to this. For example, a light source device including a parabolic reflector may be used. In the light source device, the concave lens 40 does not have to be provided.

(4) In the embodiments, the light source device 50 including the secondary mirror 30 is used. However, the invention is not limited to this. For example, a light source device not including a secondary mirror may be used.

(5) In the first and second embodiments, the second light shields 170 and 172 block partial light beams emitted from the two second regions located between the two first regions adjacent to each other in the y axis direction among the four first regions. The rotating shafts of the first light shields 162, 164, 166, and 168 and the second light shields 170 and 172 extend along the y axis. However, the invention is not limited to this. For example, second light shields may block partial light beams emitted from the two second regions located between the two first regions adjacent to each other along the x axis direction among the four first regions. Rotating shafts of first light shields and the second light shields may extend along the x axis direction.

(6) In the third embodiment, the second light shields 810 and 812 block partial light beams emitted from the two second regions located between the two first regions adjacent to each other along the y axis direction among the four first regions. The first light shields 802, 804, 806, and 808 and the second light shields 810 and 812 are configured to be capable of advancing and retracting along the x axis direction. However, the invention is not limited to this. For example, second light shields may block partial light beams emitted from the two second regions located between the two first regions adjacent to each other along the x direction among the four first regions. First light shields and the second light shields may be configured to be capable of advancing and retracing along the y axis direction.

(7) In the embodiments, the projector separately includes the mode selection device and the light control device driving circuit. However, the invention is not limited to this. For example, the projector may include a mode selection device including a light control device driving circuit.

(8) In the first and second embodiments, the light control device 160 including the two first driving devices 182 and 184 and the two second driving devices 192 and 194 is used. However, the invention is not limited to this. For example, a light control device including one or three or more first driving devices and one or three or more second driving devices may be used.

(9) In the third embodiment, the light control device 800 including the one first driving device 822 and the one second driving device 832 is used. However, the invention is not limited to this. For example, a light control device including two or more first driving devices and two or more second driving devices may be used.

(10) In the third embodiment, the projector 1004 includes the mode selection device 700 including the mode selection switch 710. However, the invention is not limited to this. For example, the projector 1004 may include a mode selection device including a mode automatic selection device.

(11) In the embodiments, the projector including the liquid crystal devices 400R, 400G, and 400B are explained as an example. However, the invention is not limited to this. The invention can also be applied to a projector including one, two, or four or more liquid crystal devices.

(12) The invention can also be applied a front projection projector that projects a projection image from an observing side and a rear projection projector that projects a projection image from a side opposite to the observing side.

The entire disclosure of Japanese Patent Application No. 2009-034906, filed Feb. 18, 2009 is expressly incorporated by reference herein.

What is claimed is:

1. A projector comprising:
an illuminating device including at least a light source device that emits light, a first lens array having plural first small lenses for dividing the light emitted from the light source device into plural partial light beams, the first lens array comprising first regions located at four corners in the first lens array when viewed along a system optical axis and second regions located between the two first regions adjacent to each other along a direction parallel to a first side in the first lens array among the first regions, and a second lens array having plural second small lenses corresponding to the plural first small lenses;
a light modulating device that modulates illumination light from the illuminating device according to image information;
a projection optical system that projects modulated light from the light modulating device as a projection image;
a light control device that is disposed in an optical path between the first lens array and the second lens array and increases or reduces a light amount of light irradiated on the light modulating device by blocking a light blocking amount corresponding to the image information in the light amount of the plural partial light beams, the light control device including first light shields for blocking partial light beams emitted from the first regions of the first lens array and second light shields for blocking partial light beams emitted from the second regions of the first lens array; and
a mode selection device that selects between a brightness priority mode and a contrast priority mode as the operation mode of the light control device,
when the brightness priority mode is selected, the light control device blocking part of the plural partial light beams by causing the first light shields and the second light shields to integrally operate,
when the contrast priority mode is selected, the light control device always blocking part of the partial light beams emitted from the first regions with the first light shields and blocking the partial light beams emitted from the second regions by causing the second light shields to operate independently from the first light shields.

2. The projector according to claim 1, wherein the mode selection device includes a mode selection switch for causing a user to select the brightness priority mode or the contrast priority mode.

3. The projector according to claim 1, wherein the mode selection device includes a mode automatic selection device that selects the brightness priority mode or the contrast priority mode on the basis of information concerning light and shade of the projection image included in the image information.

4. The projector according to claim 1, wherein
the first light shields and the second light shields are configured to be rotatable around predetermined rotating shafts parallel to the first side in the first lens array, and
the light control device further includes a first rotation driving device and a second rotation driving device for rotating the first light shields and the second light shields around the rotating shafts independently from each other.

5. The projector according to claim 1, wherein
the first light shields and the second light shields are configured to advance and retract along a first direction perpendicular to the first side in the first lens array, and
the light control device further includes a first advance and retract driving device and a second advance and retract driving device for advancing and retracting the first light shields and the second light shields along the first direction independently from each other.

6. The projector according to claim 1, wherein the illuminating device further includes:
a superimposing lens that superimposes the partial light beams from the plural second small lenses in the illuminated region; and
a polarized-light converting device arranged between the second lens array and the superimposing lens.

* * * * *